ical Examiner—Aldrich F. Medbery
United States Patent [19]
Weiland

[11] 3,863,642
[45] Feb. 4, 1975

[54] OBSTETRIC DEVICE FOR ANIMALS

[75] Inventor: Werner Weiland, Bendorf-Sayn, Germany

[73] Assignee: Rheintechnik Weiland & Kaspar OHG, Bendorf, Germany

[22] Filed: July 2, 1973

[21] Appl. No.: 375,848

[30] Foreign Application Priority Data
July 4, 1972 Germany............................ 2232713

[52] U.S. Cl................................. 128/352, 128/353
[51] Int. Cl............................................ A61b 17/42
[58] Field of Search............................ 128/252, 253

[56] References Cited
UNITED STATES PATENTS

| | | | |
|---|---|---|---|
| 2,522,508 | 9/1950 | Frank.................................. | 128/352 |
| 3,113,571 | 12/1963 | Jeeninga............................. | 128/352 |
| 3,643,664 | 2/1972 | McMillian........................... | 128/353 |

FOREIGN PATENTS OR APPLICATIONS

| | | | |
|---|---|---|---|
| 1,291,567 | 3/1962 | France............................... | 128/352 |

Primary Examiner—Aldrich F. Medbery
Attorney, Agent, or Firm—Michael S. Striker

[57] ABSTRACT

An obstetric device for aiding the birth process of cattle and the like is disclosed. The device consists of an elongated rod having an end adapted to abut an animal giving birth. The rod is provided with projections spaced longitudinally thereof and two sleeves are slidably mounted on the rod. Each sleeve has a circumferential slot which accommodates a disc, the disc circumferentially surrounding the rod with clearance. A spring in each of the slots biases the discs in such a manner that they partially project into the spaces between the projections on the rod and also partially project outwardly beyond the sleeves. The slots and discs are inclined to the elongation of the rod in such a fashion that the sleeves are able to move in a direction away from the end of the rod which abuts the animal giving birth but are prevented from moving in the opposite direction. Each sleeve is provided with a hook, the hooks on the two sleeves being located on diametrically opposite sides of the rod. A pivotable control lever for effecting movement of the sleeves is so positioned that it overlies the outwardly projecting portions of the discs. In operation, a cable is secured to each hook and the other end of the cable is connected to a leg of the animal being born. Alternate pivoting of the control lever in a sense towards and away from the rod causes alternate movements of the sleeves so that a controlled tension is exerted on the animal being born. In the event of an emergency, the control lever is pivoted as far as possible towards the rod so that it abuts the outwardly projecting portions of the discs. This causes the discs to become disengaged from the projections on the rod so that the sleeves are free to move in a direction towards the end of the rod which abuts the animal giving birth whereby the tension on the animal being born may be quickly released.

11 Claims, 4 Drawing Figures

OBSTETRIC DEVICE FOR ANIMALS

BACKGROUND OF THE INVENTION

The invention relates generally to an obstetric device. More particularly, the invention relates to an obstetric device for use with animals, especially cattle and the like, which serves as an aid in the birth process.

The obstretric devices of special interest are those of the type consisting of an elongated rod having one end which is adapted to be placed against the animal giving birth. The rod is provided with circumferential teeth and two members are shiftably mounted on the rod. Each of the shiftable members is provided with a hook and the hooks are positioned on diametrically opposite sides of the rod. When the obstretric device is in use, a cable is secured to each hook and the free end of each cable is then secured to one of the legs of the animal being born, i.e., depending upon whether the animal being born is coming out head first or vice versa, one cable is attached to one of the front or hind legs and the other cable is attached to the other of the front or hind legs. The cable is attached to the leg of the animal being born in the form of a sling. A control lever is provided for effecting movement of the shiftable members in a direction away from that end of the rod which abuts the animmal giving birth. The control lever is common to both of the shiftable members, i.e., the members carrying the hooks, and is pivotally linked to each of the shiftable members. Movement of the shiftable members in a direction towards the animal giving birth is prevented by means of a protrusion provided on each of these members which protrusion lies in one of the spaces between adjacent teeth of the rod and abuts one of the teeth in such a manner that no movement of the respective shiftable member in this direction can occur. The operation of the control lever is such that, when it is pivoted in a first direction, there is a tendency for one of the shiftable members to move away from the animal giving birth and for the other of the shiftable members to move towards the animal giving birth. At the same time, the protrusion of the former shiftable member is caused to leave the space between the teeth of the rod so that movement of this member in a direction away from the animal giving birth does, in fact, occur whereas the protrusion of the other shiftable member remains in the space between the teeth so that this member remains stationary. When the control lever is next pivoted in the opposite direction, the reverse occurs, that is, the shiftable member which was originally stationary now moves in a direction away from the animal giving birth while the shiftable member which originally moved now remains stationary. In this manner, a controlled tension may be exerted on the animal being born so that the latter is helped in the birth process.

An obstetric device of the type described above is known from German Pat. No. 1,133,076. This device has been shown to work well in practice. However, a difficulty exists in the operation of this device since the tension on the animal being born cannot be released suddenly or quickly. A sudden release of the tension may, however, be necessary in many cases, especially when complications arise during the birth, or for other reasons which require that the tension be suddenly released.

SUMMARY OF THE INVENTION

It is, accordingly, an object of the invention to provide a novel obstetric device for aiding the birth process of animals.

More particularly, it is an object of the invention to provide an obstetric device of the general character described whereby the tension exerted on the animal being born may be suddenly and quickly released.

Another object of the invention is to provide an obstetric device of the general character described whereby the tension exerted on the animal being born may be released with a minimum expenditure of strength by the person operating the device.

A further object of the invention is to provide an obstetric device of the general character described whereby the tension exerted on the animal being born may be released with a single manipulation by the person operating the device.

An additional object of the invention is to provide an obstetric device of the general character described whereby, during normal operation, a tension may be continuously exerted on the animal being born.

A supplementary object of the invention is to provide an obstetric device of the genreal character described which is simple and reliable in its operation.

In accordance with the above objects and others which will become apparent, the invention provides an obstetric device for use with animals, particularly cattle and the like, which comprises an elongated member having and end adapted to abut an animal giving birth. At least two shiftable members are mounted on the elongated member and these are adapted to be connected with an animal being born. Control means is provided for effecting movement of the shiftable members in a direction away from that end of the elongated member which abuts the animal giving birth so that, when the shiftable members are connected with the animal being born, a tension may be continuously exerted on the latter to thereby aid the birth process. Holding means prevents movement of the shiftable members in a direction towards that end of the elongated member which abuts the animal giving birth and releasing means is provided for substantially simultaneously releasing the shiftable members for movement in this direction so that, in case of emergency, the tension exerted on the animal being born may be quickly released.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
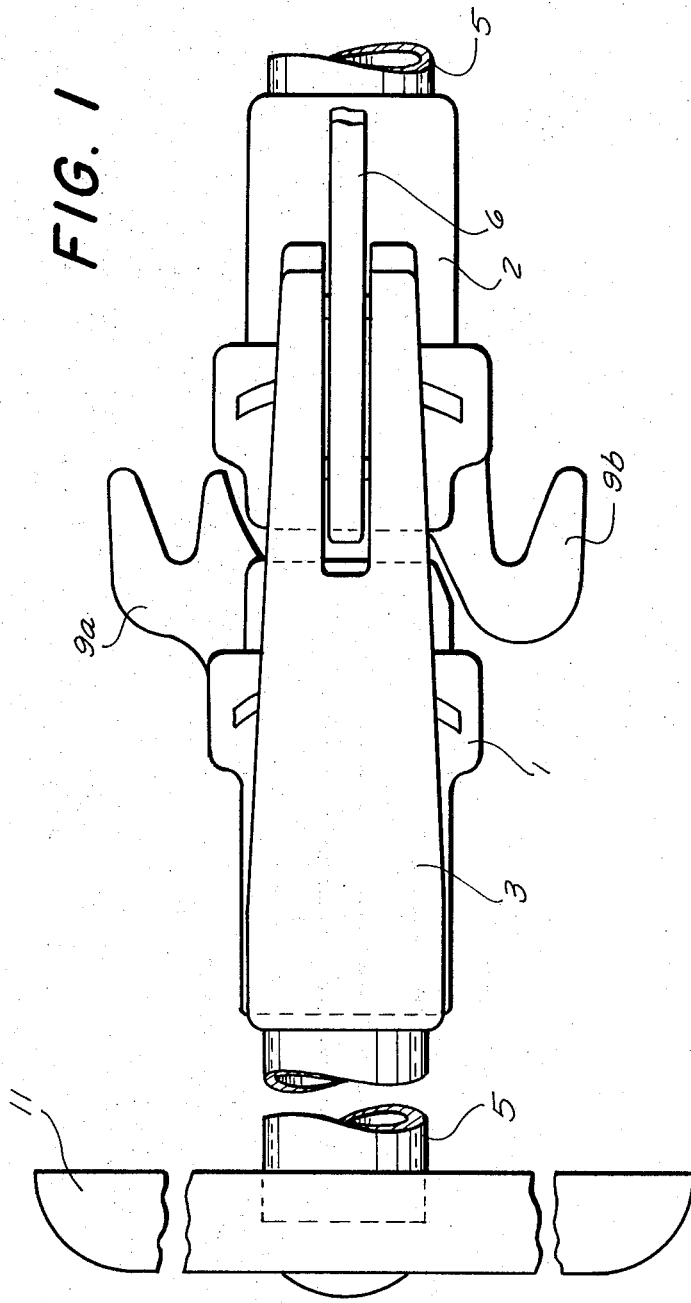
FIG. 1 is a top view of part of an obstetric device according to the invention.
Figure 2:
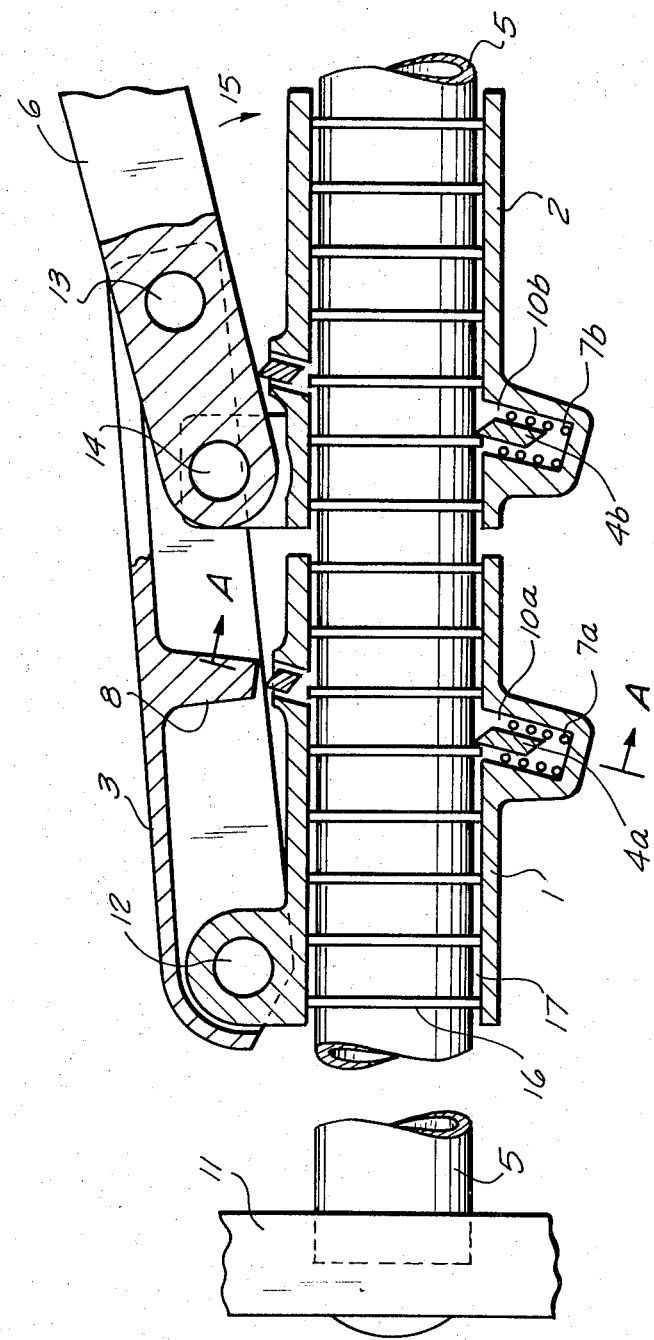
FIG. 2 is a side view, partly in section, of the part of the obstetric device shown in FIG. 1.

Referring now to the drawing and, in particular, to FIGS. 1 and 2, it will be observed that the novel obstetric device includes an elongated member 5 which is preferably, but not necessarily, configurated as a tube. Since the tube 5 per se does not form part of the invention, it is not shown in its entirety. However, it may be seen that the tube 5 has an end 11 which is adapted to abut an animal giving birth. The end 11 may include a suitably configured brace which latter may be padded so as to avoid irritation of the animal giving birth. Such a brace may, for example, be screwed onto the rod 5 or secured thereto in any suitable fashion. Although both the top and side views of the brace are here shown as being the same for purposes of illustration, the brace may have any suitable configuration and, for instance, may have the form of a narrow rectangle when seen head-on. The tube 5 is illustrated as being provided with external circumferentially extending teeth or projections 16 adjacent ones of which are spaced from each other in longitudinal direction of the tube 5 so as to form recesses 17 therebetween. It is pointed out, however, that the tube 5 need not be provided with the projections 16 but, instead, the outer circumferential surface of the tube 5 may be knurled so as to increase the friction thereof.

Two members 1 and 2 are shiftably mounted on the tube 5, i.e., on the projections 16 provided thereon. Preferably, the members 1 and 2 are sleeves and are slidably mounted on the tube 5. Each of the sleeves 1 and 2 comprises a hook or hook-shaped portion, indicated perspectively at 9a and 9b, and the hooks 9a and 9b are advantageously located on diametrically opposite sides of the tube 5. As most clearly seen in FIG. 2, each of the sleeves 1 and 2 is provided with a circumferential slot, the respective slots being shown at 10a and 10b. A disc 4a is accommodated in the slot 10a and a disc 4b is accommodated in the slot 10b. It is preferable when the slots 10a and 10b and the respective discs 4a and 4b are inclined to the elongation of the tube 5 as shown, that is, when these are inclined to the elongation of the tube 5 at an angle different from 90°. However, it will become clearer later that this is not absolutely necessary. The discs 4a and 4b circumferentially surround the tube 5 with clearance so that these are movable in a direction radially of their respective slots 10a and 10b, i.e., at an angle to the elongation of the tube 5. It will be appreciated that the diameters of the slots 10a and 10b are sufficiently large to permit such movement of the discs 4a and 4b. Also located in the respective slots 10a and 10 b are biasing elements 7a and 7b, here illustrated as being in the form of springs. The springs 7a and 7b bias the respective discs 4a and 4b into the position indicated in FIGS. 2 and 3, that is, into a position where the latter project into the recesses 17 defined between adjacent ones of the projections 16.

The control mechanism for effecting movement of the sleeves 1 and 2 longitudinally of the tube 5 includes two sections 3 and 6. AS best seen FIG. 2, the section 3 has two end portions and is pivotally connected to the sleeve 1 in the region of one of these end portions, the connection being indicated at 12. The section 6 is pivotally connected to the section 3 in the region of the other end portion of the latter, this connection being shown at 13. In addition, the section 6 and the sleeve 2 are pivotally connected to one another as indicated at 14. The section 3 may be provided with a protuberance 8 which is aligned with the disc 4a in the sleeve 1 whereas the section 6 overlies the disc 4b in the sleeve 2.

In operation, the end 11 of the tube 5 is placed against the body of an animal giving birth. The end 11 of the tube 5 will normally be placed aginst the mother animal in the region of the opening of the birth canal. Two ropes or cables (not shown) are supplied and one end of each of these is secured to a respective one of the hooks 9a and 9b. Depending upon whether the animal being born is coming out with its front legs first or with its hind legs first, the other end of each of the ropes is then attached to a front leg or a hind leg of the animal being born. At the beginning of the operation, the hooks 9a and 9b are located side-by-side in a manner shown in FIG. 1.

Figure 3:
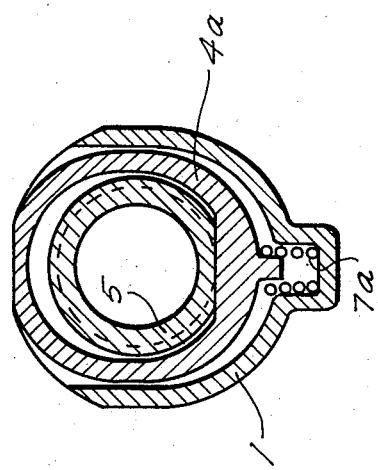
FIG. 3 is a view in the direction of the arrows A—A of FIG. 2.

The operating position of the discs 4a and 4b is that illustrated in FIGS. 2 and 3 or, in other words, that position where the discs 4a and 4b project into the recesses 17 intermediate adjacent ones of the projections 16. Thus, since the springs 7a and 7b bias the discs 4a and 4b into these recesses 17, the discs 4a and 4b will prevent movement of the sleeves 1 and 2 towards the end 11 of the tube 5, this effect being enhanced because of the inclination of the discs 4a and 4b to the elongation of the tube 5 at an angle other than 90°. On the other hand, it is this inclination of the discs 4a and 4b which permits movement of the sleeves 1 and 2 in a direction away from the end 11 of the tube 5 even though movement of the sleeves 1 and 2 in the opposite direction is prevented. It will be seen that the discs 4a and 4b constitute holding means for preventing movement of the sleeves 1 and 2 in a direction towards the end 11 of the tube 5. It is also pointed out here, and as most clearly seen in FIG. 2, that in the operating position just described, the discs 4a and 4b project outwardly from their respective slots 10a and 10b towards the sections 3 and 6 of the control mechanism.

The novel obstetric device is intended to aid the birth process by pulling the animal being born from the womb of the mother animal. With reference to FIG. 2, this is accomplished by manipulating the ocntrol mechanism in the manner to be explained. Pivoting of hthe section 6, which serves as a handle, in a direction opposite to that indicated by the arrow 15, that is, in a sense away from the tube 5, will cause shifting or movement of the sleeve 2 in a direction away from the end 11 of the tube 5. Although such pivoting of the handle 6 simultaneously tends to move the sleeve 1 in a direction towards the end 11 of the tube 5, it will be appreciated that such movement of the sleeve 1 is prevented because the disc 4a projects into a recess 17 and abuts the corresponding projection 16 in such a manner that this movement cannot occur. When the handle 6 is next pivoted in the direction of the arrow 15 or, in other words, in a sense towards the tube 5, but not far enough for the handle 6 to abut the disc 4b and for the protuberance 8 of the section 3 to abut the disc 4a, the effect will be to shift or move the sleeve 1 in a direction away from the end 11 of the tube 5. In this case, it is the sleeve 2 which tends to move in a direction towards the end 11 of the tube 5 but, again, such movement is prevented by virtue of the disc 4b which projects into a recess 17 and bears against a projection 16. Thus, the control mechanism is able to effect alternate movements of the sleeves 1 and 2 in a direction away from the end 11 of the tube 5 by pivoting the handle 6 back and forth as just described. In this manner, a controlled tension may be continuously exerted on the animal being born in a sense pulling this animal from the womb of the mother animal so that the birth process is facilitated. The alternate movements of the sleeves 1 and 2 in a direction away from the end 11 of the tube 5 may be continued until the animal being born has been completely removed from the womb of the mother animal.

In the event of complications which may arise during the birth process, or in the event of an emergency, it may be necessary to quickly release the tension on the animal being born. When this occurs, the handle 6 is pivoted as far as possible in the direction of the arrow 15. This causes the handle 6 to abut the disc 4b in the sleeve 2 and the protuberance 8 of the section 3 to abut the disc 4a in the sleeve 1. Since, as mentioned earlier, the discs 4a and 4b project outwardly from their respective slots 10a and 10b towards the handle 6 and the section 3 when they are in their operating position, pivoting of the handle 6 as far as possible in the direction of the arrow 15 permits the handle 6 and the protuberance 8 of the section 3 to move the disc 4b and 4a, respectively, in radial direction of the slots 10b and 10a. As a result of this movement, the discs 4a and 4b will no longer project into the recesses 17 between adjacent projections 16 and the sleeves 1 and 2 will be free to move in a direction towards the end 11 of the tube 5. Therefore, the sleeves 1 and 2 may be shifted towards the end 11 of the tube 5 with very little or no resistance in order to release the tension on the animal being born. The freeing of the sleeves 1 and 2 for movement in a direction towards the end 11 of the tube 5 occurs pratically simultaneously and this freeing of the sleeves 1 and 2 may be accomplished very easily even when the tension in the cables is large. The sleeves 1 and 2 may be moved towards the end 11 of the tube 5 as much or as little as is necessary to overcome the complications which have occurred. The springs 7a and 7b insure that the respective discs 4a and 4b will again project into the recesses 17 once the handle 6 has been pivoted back far enough in a direction opposite to that indicated by the arrow 15 so that, if desired, the operation of pulling the aanimal being born from the womb of the mother animal may be subsequently continued. It will be seen that a novel obstetric device has been provided whereby the tension on an animal being born may be very quickly and easily released and without requiring the exertion of a large amount of force.

It will be appreciated from the preceding description that the slots 10a and 10b and the respective discs 4a and 4b need not be inclined to the elongation of the tube 5 in the manner shown in FIG. 1. For example, the same effect could be obtained by having these arranged normal to the elongation of the tube 5 and by then configurating the inner circumferential surfaces of the discs 4a and 4b so as to be inclined with respect to the outer circumferential surface of the tube 5. It will be further appreciated that the same effect could equally well be obtained if, instead of providing the tube 5 with the projections 16, the outer circumferential surface of the tube 5 is knurled over at least a major portion thereof. In such a case, the springs 7a and 7b would serve to urge the discs 4a and 4b, respectively, into firm engagement with the outer circumferential surface of the tube 5. Since the coefficient of friction of such a knurled surface is high, the discs 4a and 4b would then prevent movement of the respective sleeves 1 and 2 in a direction towards the end 11 of the tube 5 when they are in their operating position, i.e., when they bear against the outer circumferential surface of the tube 5. The slots 10a and 10b and their respective discs 4a and 4b may, in such an instance, be inclined to the elongation of the tube 5 in the manner shown in FIG. 2 or, again, it is also possible for the discs 4a and 4b to be arranged normal to the elongation of the tube 5 and to then have the inner circumferential surfaces of the discs 4a and 4b so configurated that these are inclined with respect to the outer circumferential surface of the tube 5.

Figure 4:
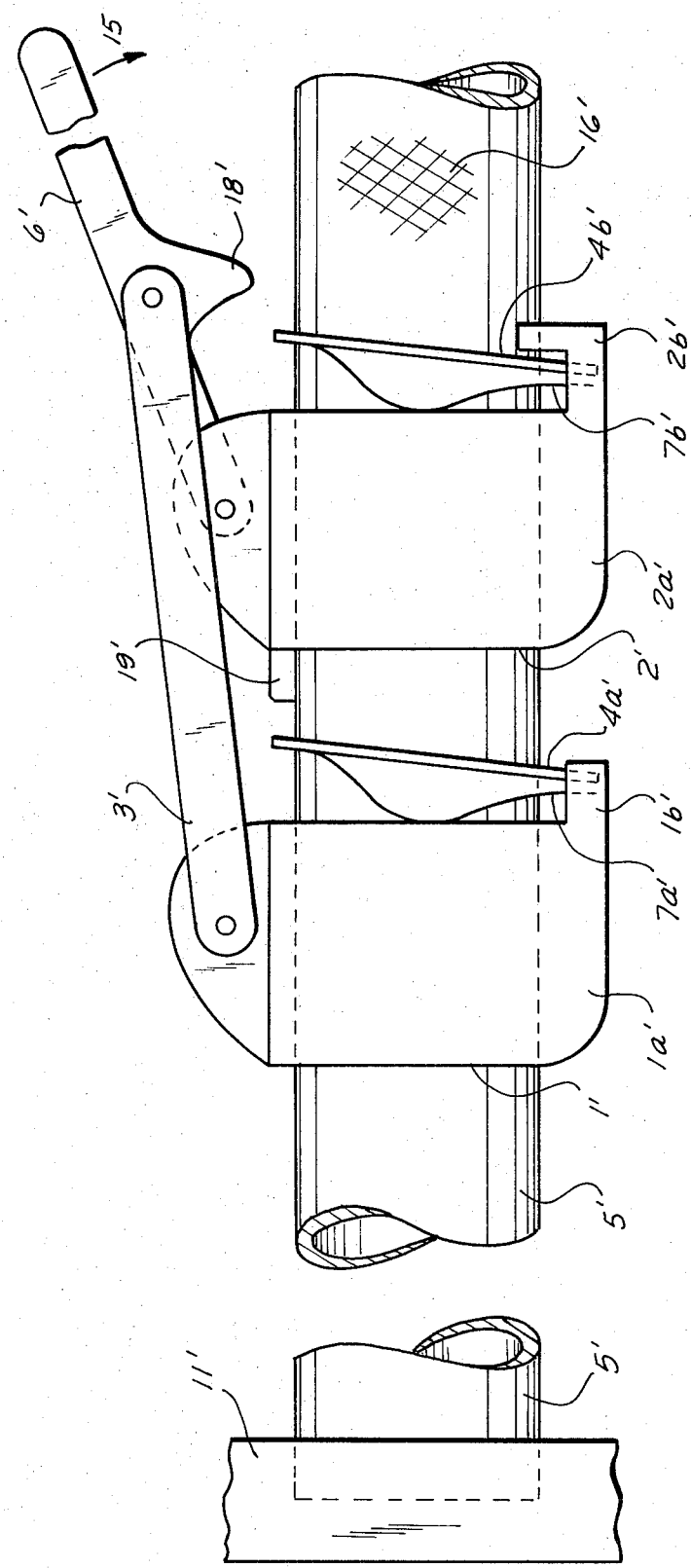
FIG. 4 is a side view of an obstetric device showing another embodiment of the invention.

Another advantageous embodiment of the invention is shown in FIG. 4 wherein the parts of the oabstetric device corresponding to those in FIGS. 1-3 are designated with the same reference numerals which here, however, are primed. In this embodiment, the outer circumferential surface of the tube 5' is favorably knurled as indicated diagrammatically at 16', it being understood that the outer circumferential surface of the tube 5' is knurled over at least a major portion thereof. The tube 5' has an end 11' adapted to abut the body of an animal giving birth. Two members 1' and 2' are shiftably mounted on the tube 5' and, again, these are preferably mounted for sliding movement on the latter. The member 1' includes a sleeve portion 1a' and another portion 1b' and, similarly, the member 2' includes a sleeve portion 2a' and another portion 2b'. The sleeve portion 2a' of the member 2' is further provided with an abutment 19'.

Two discs 4a' and 4b' circumferentially surround the tube 5' and the disc 4a' projects inwardly of the portion 1b' of the member 1' whereas the disc 4b' projects inwardly of the portion 2b' of the member 2'. As shown, the discs 4a' and 4b' are preferably inclined to the elongation of the tube 5' at an angle other than 90°. The clearance space between the tube 5' and the discs 4a' and 4b' is relatively small for a purpose which will become clear presently. Two biasing elements, here illustrated as being in the form of dished springs 7a' and 7b', are also provided. The spring 7a' bears against the disc 4a' on the one hand and against the sleeve portion 1a' of the member 1' on the other hand and projects inwardly of the portion 1b' of the latter. Likewise, the spring 7b' bears against the disc 4b' and against the sleeve portion 2a' of the member 2' and projects inwardly of the portion 2b' of the latter. In this manner, the springs 7a' and 7b' bias the discs 4a' and 4b', respectively, into the inclined position shown in FIG. 4.

The control mechanism for effecting movement of the members 1' and 2' longitudinally of the tube 5' includes the sections 3' and 6' and is, in general, very similar to the control mechanism of the embodiment of FIGS. 1-3. In the present instance, however, in contrast to the embodiment of FIGS. 1-3, the section 6' is provided with a projection 18'.

The manipulations of the control mechanism 3', 6' so as to effect alternate movements of the members 1' and 2' longitudinally of the tube 5' is identical to that described earlier. The operating position of the discs 4a' and 4b' is that shown in FIG. 4 and in this inclined position they bear against the outer circumferential surface of the tube 5' and prevent movement of the respective members 1' and 2' in a direction towards the end 11' of the tube 5'.

The release of the tension on the animal being born is also effected in the same manner as explained previously, that is, the section 6' is pivoted as far as possible in the direction of the arrow 15. The operational difference between the embodiments of FIGS. 1–3 and FIG. 4 resides in the movement undergone by the discs 4a' and 4b' when the tension on the animal being born is to be released. Thus, in the embodiment being presently discussed, pivoting of the section 6' in the direction of the arrow 15 causes the projection 18' of the section 6' to abut the disc 4b' (from the right-hand side of the latter as seen in FIG. 4). Since such pivoting of the section 6' will result in movement of the member 1' relative to and towards the member 2', the abutment 19' provided on the sleeve portion 2a' of the member 2' will be caused to abut the disc 4a' (also from the right-hand side of the latter as seen in FIG. 4). Consequently, the discus 4a' and 4b' will be forced to move from the inclined position shown in FIG. 4 to a position where they are substantially normal to the elongation of the tube 5'. Therefor, since a clearance space is provided between the discs 4a' and 4b' and the tube 5', the discs 4a' and 4b' will then no longer engage the outer circumferential surface of the tube 5' and the members 1' and 2' will be free to move in a direction towards the end 11' of the tube 5'.

It will be understood that each of the elements described above, or two or more together, may also find a useful application in other types of construction and uses differing from the types described above.

While the invention has been illustrated and described as embodied in an obstetric device for animals, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. An obstetric device for use with animals, particularly cattle and the like, comprising an elongated member having an end adapted to abut an animal giving birth; at least two members individually shiftably mounted on said elongated member and each adapted to be connected with an animal being born; control means for effecting individual movement of said shiftable members in a direction away from said end so that a tension may be continuously exerted on the animal being born when said shiftable members are connected with the latter to thereby aid the birth process; holding means for preventing movement of said shiftable members in a direction towards said end; and means for substantially simultaneously releasing said two shiftable members comprising release means coupled with said control means and operable by the same for disengaging said two shiftable members for sliding movement in a direction towards said end, whereby in case of emergency the tension exerted on the animal being born may be quickly released.

2. An obstetric device as defined in claim 1, wherein said elongated member is tubular.

3. An obstetric device as defined in claim 1, wherein said shiftable members are sleeve members slidably mounted on said elongated member.

4. An obstetric device as defined in claim 1, wherein said elongated member is provided with external projections extending circumferentially thereof, adjacent ones of said projections being spaced from one another in longitudinal direction of said elongated member so as to define recesses therebetween, and said holding means comprising at least two movable members each of which cooperates with one of said sleeve members, each of said movable members having a first position in which it projects into one of said recesses and bears against one of said projections so as to prevent movement of the respective sleeve member in a direction towards said end while permitting movement of the same in a direction away from said end, and each of said movable members having a second position in which it is located outwardly of said recesses so as to permit movement of the respective sleeve member in a direction towards said end.

5. An obstetric device as defined in claim 1, wherein each of said shiftable members comprises a hook-shaped portion, said hook-shaped portions being located at diametrically opposite sides of said elongated member, and each of said hook-shaped portions being adapted for securing thereto one end of a cable the other end of which is secured to a leg of the animal beng born.

6. An obstetric device as defined in claim 1, wherein said control means is arranged to effect alternate movements of said shiftable members.

7. An obstetric device as defined in Claim 1, wherein said control means comprises said releasing means.

8. An obstetric device for use with animals, particularly cattle and the like, comprising an elongated member with external projections extending circumferentially thereon, said projections being spaced from one another in the longitudinal direction of said elongated member so as to define recesses therebetween, and said elongated member having an end adapted to abut an animal giving birth; at least two sleeve members each adapted to be connected with an animal being born and individually shiftably mounted on said elongated member, said shiftable sleeve members each being provided with a circumferential slot; control means for effecting individual movement of said shiftable sleeve members in a direction away from said end so that tension may be continuously exerted on the animal being born when said shiftable sleeve members are connected with the latter to thereby aid the birth process; holding means comprising a pair of discs each accommodated in one of said slots and surrounding said elongated member with clearance, each of said discs being movable radially of the respective slot between a first position in which it projects into one of said recesses and bears against one of said projections so as to prevent movement of the respective sleeve member in a direction towards said end while permitting movement of the same in a direction away from said end, and a second position in which it is located outwardly of said recesses so as to permit movement of the respective sleeve member in a direction towards said end; and releasing means for substantially simultaneoulsy releasing said shiftable sleeve members for movement in a direction towards said end, whereby in case of emergency the tension exerted on the animal being born may be quickly released.

9. An obstetric device as defined in claim 8, wherein said slots and discs are inclined to the elongation of said elongated member at an angle different from 90°.

10. An obstetric device as defined in claim 8; and further comprising biasing means in said slots for biasing said discs into said first position.

11. An obstetric device as defined in claim 8, wherein said control means comprises a first section having two end portions, said first section being pivotally connected to one of said sleeve members in the region of one of said end portions, and said control means further including a second section pivotally connected to said first section in the region of the other of said end portions, said second section also being pivotally connected to the other of said sleeve members, said first section having a protuberance extending towards said one sleeve member and aligned with the disc therein, and said second section overlying the disc in said other sleeve member, said discs projecting towards said first and second sections when they are in said first position, whereby when said discs are in said first position pivoting of said second section in a sense away from said elongated member causes movement of said other sleeve member only in a direction away from said end, pivoting of said second section in a sense towards said elongated member but short of said discs causes movement of said one sleeve member only in a direction away from said end, and further pivoting of said second section in a sense towards said elongated member causes said protuberance to abut the disc in said one sleeve member and said second section to abut the disc in said other sleeve member so as to move said discs from said first position to said second position.

* * * * *